May 14, 1968

R. W. CAMPBELL 3,382,541

PIPE APPARATUS

Filed June 24, 1965

INVENTOR.
ROBERT WARREN CAMPBELL
BY
*John C. McKinney*
ATTORNEY

May 14, 1968

R. W. CAMPBELL 3,382,541

PIPE APPARATUS

Filed June 24, 1965

INVENTOR.
ROBERT WARREN CAMPBELL
BY
*John A. McKinney*
ATTORNEY

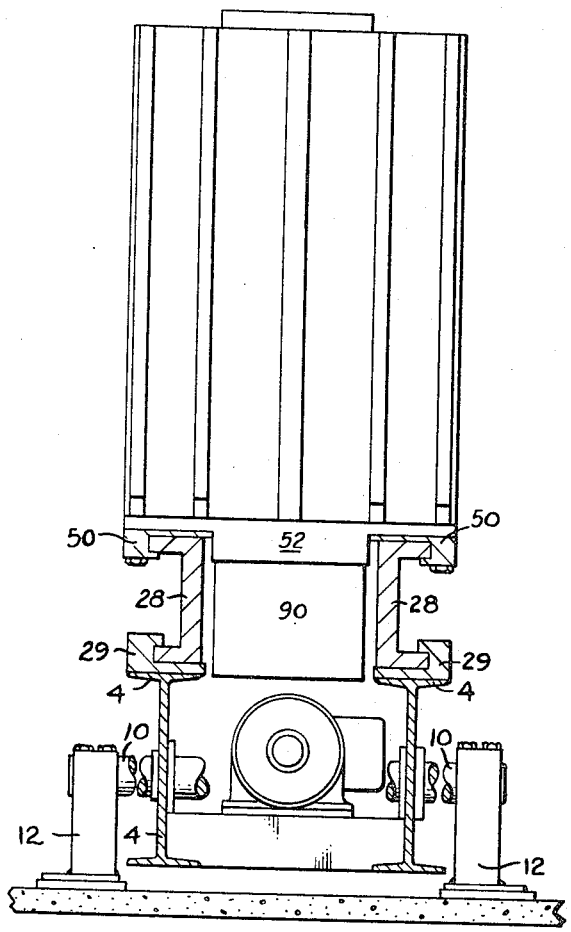

United States Patent Office 3,382,541
Patented May 14, 1968

3,382,541
PIPE APPARATUS
Robert Warren Campbell, Flemington, N.J., assignor to Johns-Manville Corporation, New York, N.Y., a corporation of New York
Filed June 24, 1965, Ser. No. 466,552
5 Claims. (Cl. 18—26)

This invention relates to apparatus for producing thermally insulated pipe and, more particularly, is directed to apparatus for producing thermally insulated pipe wherein the thermal insulation comprises a material that is foamed in place between two coaxial pipes. In the preferred embodiment of the invention, the pipes comprise an asbestos-cement material and the foamed insulation comprises a foamed polyurethane, but it is to be understood that the apparatus may readily be employed with pipes and insulation of any desired material.

The manufacture of thermally insulated pipe of the nature comprising two coaxial asbestos-cement pipes with a foamed insulating material positioned between the outer peripheral surface of a first asbestos-cement pipe and the inner peripheral surface of a second asbestos-cement pipe requires unique apparatus. The first and second asbestos-cement pipes must be held in a coaxial relationship while the insulating material is being foamed into place. Also, since the asbestos-cement pipes used in a thermally insulated pipe are protected in vulnerable areas by a coating material which has been applied as a thin layer to the necessary surfaces of the pipe, it is necessary that harsh handling of the pipe is avoided.

It is an object of the instant invention to provide apparatus for use in the manufacture of thermally insulated asbestos-cement pipe.

The foregoing object is accomplished in accordance with the instant invention by apparatus comprising a pivotally mounted frame on which the pipe holding and positioning means are supported. Adjacent one end of the frame, there is positioned a movable and adjustable head assembly for holding the end portions of a first and second asbestos-cement pipe in coaxial relationship. A similar head assembly is positioned adjacent the other end of the frame for association with the other end portions of the first and second asbestos-cement pipes. In operation, a pipe assembly comprising a first and second asbestos-cement pipe is positioned in the head assembly adjacent one end of the apparatus so that one end portion of the first asbestos-cement pipe is in coaxial relationship with one end portion of the second asbestos-cement pipe. The other head assembly is positioned to support the other end of the first asbestos-cement pipe. When in this relationship, there is an annular space between the outer peripheral surface of the first asbestos-cement pipe and the inner peripheral surface of the second asbestos-cement pipe. The frame is then pivoted so that the first and second asbestos-cement pipes are positioned at an angle of at least four degrees relative to the horizontal. A suitable probe is then inserted into the annular space between the first and second asbestos-cement pipes and a foamable material is deposited into the annular space. The probe is then removed and the other head assembly is moved into contact with the other end of the second asbestos-cement pipe so as to support both the first and second asbestos-cement pipes in coaxial realtionship. Appropriate means are used to seal off the axial extremities of the annular space between the first and second asbestos-cement pipes, and the foamable material is allowed to foam and expand until the annular space is filled with the thermal insulation. In the preferred embodiment of the invention, the thermal insulation comprises a foamed in place polyurethane.

The invention will be more fully understood and further objects and advantages thereof will become apparent when reference is made to the following detailed description of a preferred embodiment of the invention and the accompanying drawings in which:

FIG. 4 is a section taken on the plane passing through the lines 4—4 of FIG. 1 with parts removed.

Figure 1:
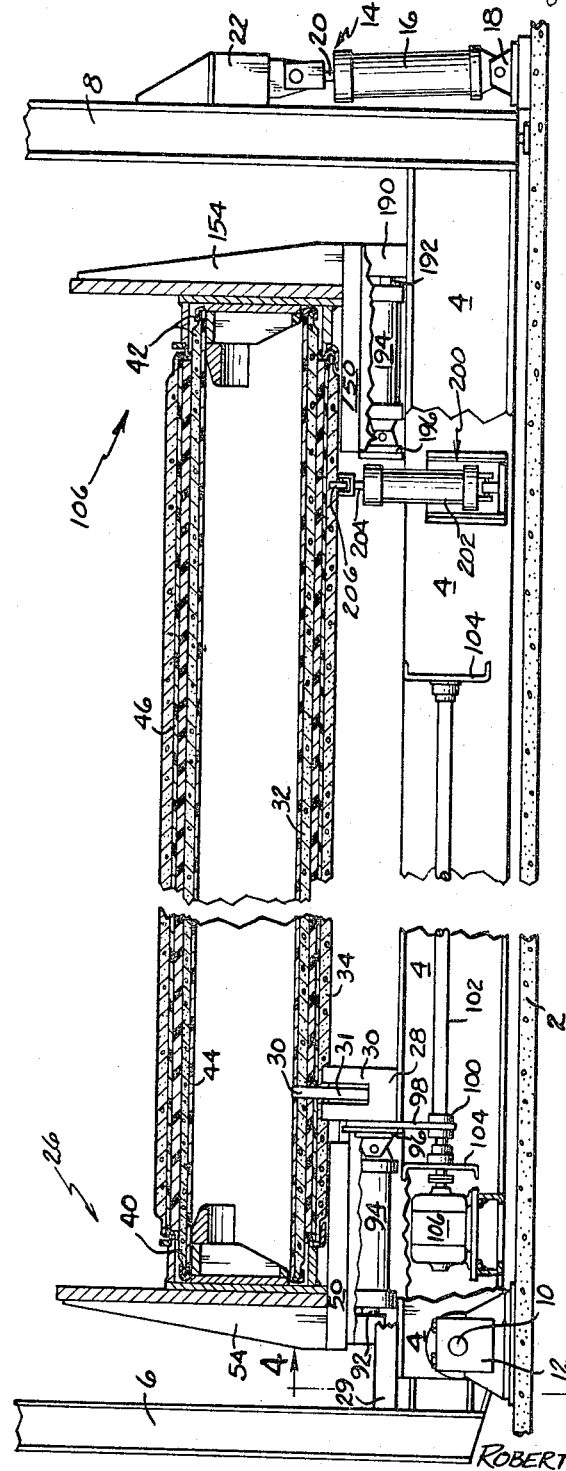
FIG. 1 is a schematic illustration of apparatus made in accordance with the instant invention.

Referring to the drawings there is shown in FIG. 1, apparatus supported on a base 2 comprising a pair of parallel beams 4 connected at one end to a pair of vertical support beams 6 and at the other end to a pair of vertical support beams 8. Adjacent the one end, the beams 4 are connected to a shaft 10 which is rotatably received in a pair of spaced bearing mounts 12. Adjacent the other end of the frame there is located a hydraulic mechanism 14 comprising a hydraulic cylinder 16 pivotally mounted to a fixed base 18 and a piston 20 attached to move into and out of the cylinder 16. The piston 20 is pivotally secured to the support 22 which is attached to and joins the vertical support beams 8. The hydraulic means 14 functions to move the beams 4 and everything associated therewith about the pivot arrangement comprising the shaft 10 and the mounts 12 so that the beams 4 may be positioned at the desired angle relative to the horizontal. This angular position depends primarily upon the relative diameters of the pipe and the type of foamable material being used.

Adjacent to the juncture of the beams 4 and 6, there is located the head assembly 26 comprising a pair of beams 28 which are supported in rails 29 secured to the beams 4 so that the beams 28 may be moved over the rails 29 toward and away from the vertical support beam 6. The ends of the beams 28 furtherest from the vertical beams 6 are secured to a base 30 which extends between and joins the beams 28. A removable notched member 31 supports the pipe assembly comprising a first asbestos-cemet pipe 32 located within a second asbestos-cement pipe 34 wherein the first asbestos-cement pipe 32 has an outer peripheral surface 36 having a smaller diameter than the diameter of the inner peripheral surface 38 of the second asbestos-cement pipe 34. Also, it is noted that the first asbestos-cement pipe 32 extends in an axial direction a distance greater than the axial extent of the second asbestos-cement pipe 34 so as to provide for end portions 40 and 42 on the first asbestos-cement pipe 32. In the preferred embodiment of the invention, the first asbestos-cement pipe 32 is provided with a coating 44 on the inner peripheral surface therein wherein such coating extends over the axial extremity of the asbestos-cement pipe 32 and a portion of the outer peripheral surface of the end portions 40 and 42 thereof. The second asbestos-cement pipe 34 is provided with a coating 46 on the inner peripheral surface thereof.

Mounted on the beams 28 for movement therewith is the remaining portion of the head assembly 26 comprising the apparatus for holding the ends of the asbestos-cement pipes 34 and 36. This apparatus comprises a pair of beams 50 supported on the beams 28 for movement therewith and also for movement relative thereto. A member 52 joins the beams 50 and is connected to means, as described below, which governs the movement of the beams 50 toward and away from the vertical support 6 independent of the movement of the beams 28. A vertically extending support 54 is attached to the top surface of the member 52. Mounted on the face 56 of the support 54 are a pair of cooperating pipe-holding devices 58 and 60. The device 60 comprises a plate 62 secured to the face 56 and the sleeve 64 attached to the plate 62.

The inner peripheral surface 66 of the sleeve 64 is generally cylindrical while the outer peripheral surface thereof has two generally cylindrical sections 68 and 70 with the section 70 having the smaller outside diameter. Secured in the outer peripheral surface of the section 70 adjacent its juncture with the section 72 and the surrounding lower portion thereof is a pipe-holding and positioning member 72 which extends with the outer peripheral surface 70 for approximately 180 degrees. The member 72 is provided with an inclined surface 74 for a purpose to be described. The member 72 is spaced a distance from the outer peripheral surface of the section 70 by a mounting ring 76 which comprises a stop member against which the axial extremity of the second asbestos-cement pipe 34 is attached to abut so as to position the first and second asbestos-cement pipes properly in the head assembly 26. The axial extremity of the section 70 is adapted to carry an annular end plug 78 for a purpose to be described.

The device 58 comprises a plate 80 secured to the plate 62 and a sleeve 82 attached to the plate 80. The outer peripheral surface 84 of the sleeve 82 is generally cylindrical and the upper portion of the sleeve 82 extends in an axial direction for a distance greater than the axial extent of the lower portion thereof. A pipe-holding and positioning member 86 is secured to the axial extremity of the upper portion of the sleeve 82 such as by welding. The outer surface 87 of the member 86 is generally arcuate and extends with the axial extremity of the upper portion of the sleeve 82 for a distance of approximately 120 degrees. The outer surface 87 of the member 86 is further provided with an inclined surface 88 for a purpose to be described.

The means for moving the beams 50 and, therefore, the pipe-holding devices 58 and 60 relative to the beams 28 comprises an extension 90 which protrudes below the member 52. The extension 90 is pivotally attached at 91 to the piston 92 which moves in response to hydraulic pressure into and out of the hydraulic cylinder 94. The hydraulic cylinder 94 is pivotally attached to a base 96 which is in turn connected to one end of a plate 98 which is secured to the base 30 for movement therewith. At its other end, the plate 98 carries a gear box 100 which is operatively connected with a rotatable worm 102 which is mounted for rotation in supports 104. The worm 102 is driven by the motor 106 and functions to move the plate 90 and, therefor, the base 30 and head assembly 26 toward and away from the vertical support beams 6.

At the other end of the beams 4, there is provided a second head assembly 126 which is similar to the head assembly 26 except no means are provided to move the beams 128 relative to the beams 4. The parts of the head assembly 126 which correspond to similar parts of head assembly 26 have been given similar reference numbers preceded by the number 1. For example, the support 54 for head assembly 126 which is similar to support 54 of head assembly 26 is numbered 154. Accordingly, a complete description of these similar parts is not considered necessary. The head assembly 126 is moved toward and away from the vertical support beams 8 by the hydraulic cylinder 194 and piston 192 wherein the plate 196 of the hydraulic cylinder 194 is secured to and joins the beams 4. Mounted on and between the beams 4 adjacent the head assembly 126 is hydraulic means 200 comprising a hydraulic cylinder 202 and a piston 204 having on its axial extremity a member 206 for supporting the other ends of the first and second asbestos-cement pipes 32 and 34 prior to the movement of the head assembly 126 into pipe supporting position.

Figure 2:
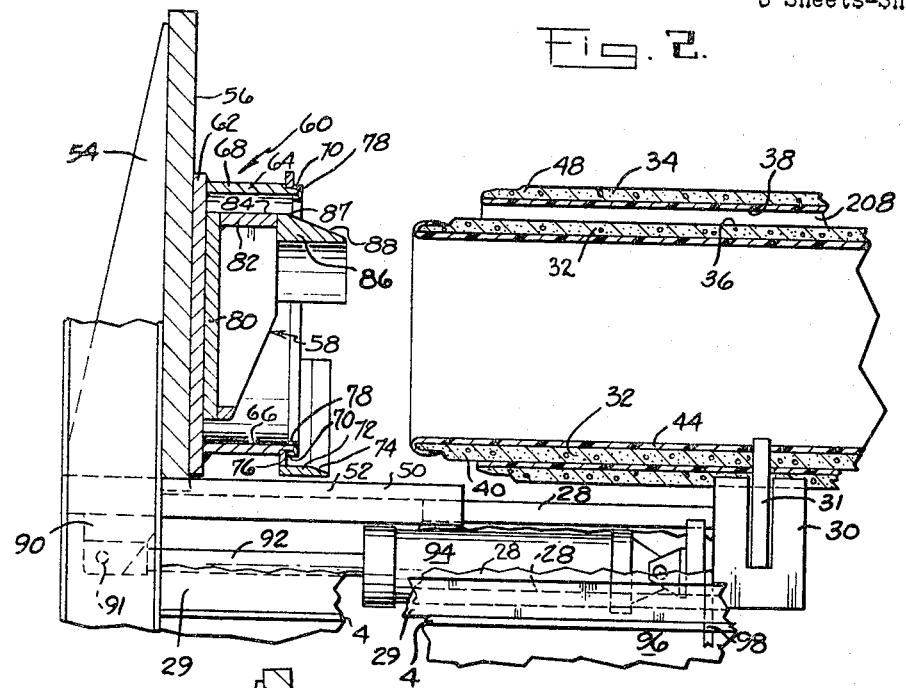
FIG. 2 is an enlarged view of the head assembly adjacent one end of the apparatus.

In operation, the members 31 and 206 are positioned at appropriate locations to support a pipe assembly comprising a first asbestos-cement pipe 32 and a second asbestos-cement pipe 34. The proper positioning of the member 31 is accomplished by moving the base 30 by the motor 106 through the drive means 100 and 102. The member 31 is positioned according to the axial extent of the pipe 34. The head assemblies 26 and 126 are moved to positions closest respectively to the vertical support beams 6 and 8, and annular end plugs 78 and 178 are positioned one over each axial extremity of the sections 70 and 170. The pipe assembly is then positioned on the members 30 and 206 with the outer peripheral surface of the second asbestos-cement pipe 34 in contact with the members 30 and 206. As illustrated in FIG. 2, the bottom portion of the outer peripheral surface of the first asbestos-cement pipe 32 is in contact with the inner peripheral surface of the second asbestos-cement pipe 34. hydraulic means are then actuated to move the piston 92 into the hydraulic cylinder 94 so as to move the head assembly 26 in a direction away from the vertical support beams 6. As the head assembly 26 moves toward the pipe assembly, the inclined surface 88 contacts the juncture of the axial extremity and inner peripheral surface of the first asbestos-cement pipe 32 to raise the asbestos-cement pipe 32 out of contact with the second asbestos-cement pipe 34. The movement of the head assembly 26 is continued until the inner peripheral surface of the first asbestos-cement pipe 32 is supported on the outer peripheral surface of the sleeve 82. It is noted that the diameter of the outer peripheral surface 84 of the sleeve 82 is substantially the same as the diameter of the inner peripheral surface of the coating 44 on the first asbestos-cement pipe 32. After the first asbestos-cement pipe 32 has been raised to this position, the continued movement of the head assembly 26 causes the inclined surface 74 to contact the junction of the axial extremity and outer peripheral surface of the second asbestos-cement pipe 34 to raise the second asbestos-cement pipe 34 into its proper position in the head assembly 26. The movement of the head assembly 26 is continued until the axial extremity of the second asbestos-cement pipe 34 contacts the stop member 76. It is noted that the annular end plug 78 bridges the annular space between the outer peripheral surface of the first asbestos-cement pipe 32 and the inner peripheral surface of the second asbestos-cement pipe 34 adjacent the axial extremity of the second asbestos-cement pipe 34.

Figure 3:
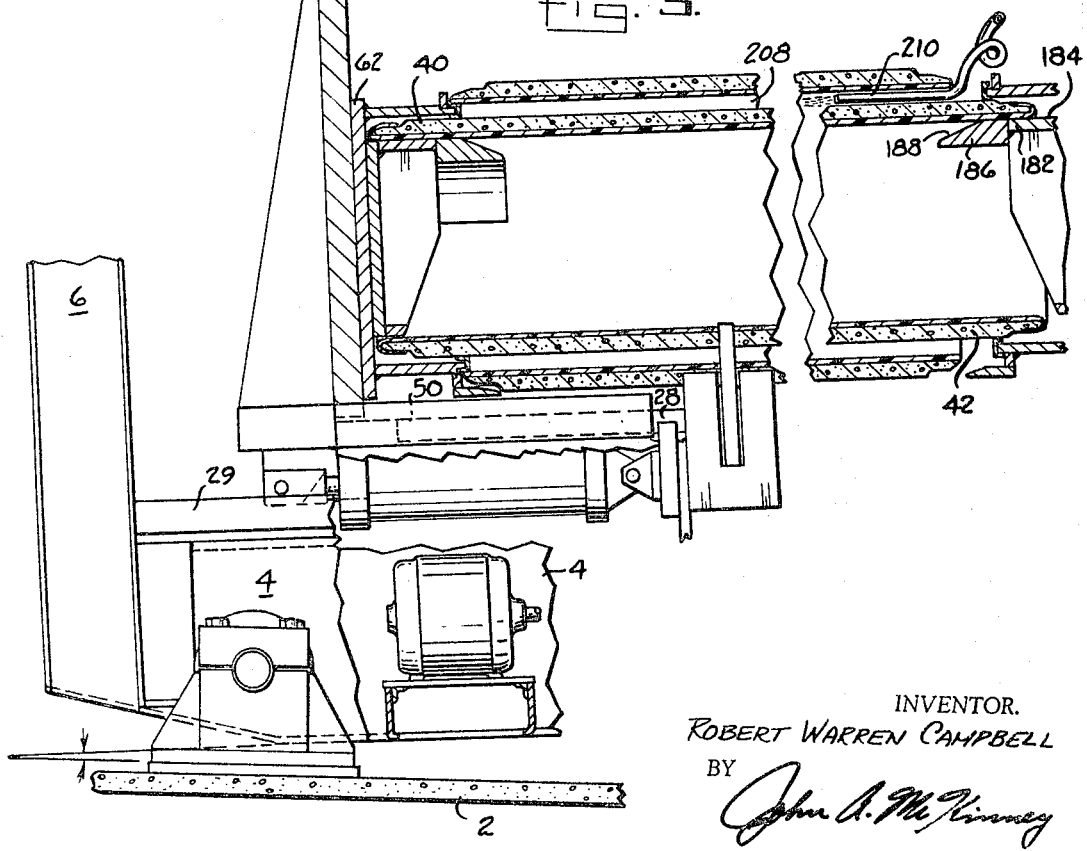
FIG. 3 is an enlarged view showing portions of the apparatus in the inclined position.

As illustrated in FIG. 3, hydraulic means are actuated and the other head assembly 126 is moved in a direction away from the vertical support beams 8 until the first asbestos-cement pipe has been raised by the surface 188 to a position where it is supported by the outer peripheral surface 184 of the sleeve 182. The movement of the head assembly 126 toward the second asbestos-cement pipe 34 is halted in the position illustrated in FIG. 3 and the hydraulic means 14 is actuated to tilt all of the apparatus mounted on the beams 4 and, therefore, the pipes 32 and 34 to an inclined position which is at least four degrees to the horizontal. The angle at which the pipes are held is dependent upon the type of insulating material and the size of the pipe. Generally this angle varies from about four to twelve degrees. A probe 210 is then inserted into the annular space 208 between the outer peripheral surface of the first asbestos-cement pipe 32 and the inner peripheral surface of the second asbestos-cement pipe 34 and suitable components of a material which may be foamed into a thermal insulation are deposited through the probe into the annular space 208. After a sufficient amount of foamable material has been deposited into the annular space 208, the probe 210 is withdrawn and the movement of the head assembly 126 into the pipes 32 and 34 is continued until the other axial extremity of the second asbestos-cement pipe 34 contacts the stop member 176 with an annular end plug 178 bridging the annular space between the outer peripheral surface of the first asbestos-cement pipe 32 and the inner peripheral surface of the second asbestos-cement pipe 34 adjacent the axial extremity of the second asbestos-cement pipe 34. The foamable material then proceeds to foam and expand so as to fill the annular space 208 with a foamed in place thermal insulation. The beams 4 are then lowered to a horizontal position, the head assemblies 26 and 126 retracted, and the completed thermally insulated pipe is removed from the apparatus. In the preferred embodiment of the invention, the thermal insulation comprises a foamed polyurethane which is the product formed by reacting an isocyanate with a resin containing hydrogen reacted at 190° F. Also, if desired, other means in addition to or instead of may be used with or in place of the annular ring-shaped members 78 and 178 to seal the gap between the first and second asbestos-cement pipes.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. Apparatus for use in forming a thermally insulated pipe comprising:
    (a) means for supporting a first and second asbestos-cement pipe in coaxial relationship,
    (b) said first asbestos-cement pipe having an outside diameter less than the inside diameter of said second asbestos-cement pipe so as to form an annular space therebetween, and said first asbestos-cement pipe having an axial extent greater than the axial extent of said second asbestos-cement pipe and positioned to protrude past each axial extremity of said second asbestos-cement pipe,
    (c) means for pivotally mounting one end of said supporting means,
    (d) means for positioning a fluid retaining means between and in contact with the outer peripheral surface of said first asbestos-cement pipe and the inner peripheral surface of said second asbestos-cement pipe adjacent one axial extremity of said second asbestos-cement pipe,
    (e) means adjacent the other end of said supporting means for moving said supporting means about said pivot to a position inclined relative to the horizontal,
    (f) means for depositing an expandable thermal insulating material into said annular space between said outer peripheral surface of said first asbestos-cement pipe and the inner peripheral surface of said second asbestos-cement pipe,
    (g) means for positioning a fluid retaining means between and in contact with the outer peripheral surface of said first asbestos-cement pipe and the inner peripheral surface of said second asbestos-cement pipe adjacent the other axial extremity of said second asbestos-cement pipe,
    (h) means for removing said supporting means from said first and second asbestos-cement pipes after said expandable thermal insulating material has expanded to fill said annular space between the outer peripheral surface of said first asbestos-cement pipe and the inner peripheral surface of said second asbestos-cement pipe.

2. Apparatus as defined in claim 1 wherein said supporting means comprises:
    (a) a movable base,
    (b) a first support means attached to said base for contacting the inner peripheral surface of said first asbestos-cement pipe,
    (c) a second support means attached to said base for contacting the outer peripheral surface of said second asbestos-cement pipe, and
    (d) means for moving said base to move said first and second support into and out of contact with said first and second asbestos-cement pipe.

3. Apparatus as defined in claim 2 wherein said first support comprises:
    (a) a generally arcuate portion having a surface complementary to the inner peripheral surface of said first asbestos-cement pipe, and
    (b) an inclined surface adjacent said arcuate portion for making the initial contact with said first asbestos-cement pipe.

4. Apparatus as defined in claim 3 wherein said second support comprises:
    (a) a generally arcuate portion having a surface complementary to a portion of the outer peripheral surface of said second asbestos cement pipe, and
    (b) an inclined surface adjacent said arcuate portion for making the initial contact with the outer peripheral surface of said second asbestos-cement pipe.

5. Asbestos for use in forming a thermally insulated pipe comprising:
    (a) means for supporting a first and second asbestos-cement pipe in coaxial relationship,
    (b) said first asbestos-cement pipe having an outside diameter less than the inside diameter of said second asbestos-cement pipe so as to form an annular space therebetween, and said first asbestos-cement pipe having an axial extent greater than the axial extent of said second asbestos-cement pipe and positioned to protrude past each axial extremity of said second asbestos-cement pipe,
    (c) means for pivotally mounting one end of said supporting means,
    (d) means for inserting a ring-shaped fluid-impervious member between and in contact with the outer peripreral surface of said first asbestos-cement pipe and the inner peripheral surface of said second asbestos-cement pipe adjacent one axial extremity of said second asbestos-cement pipe,
    (e) means adjacent the other end of supporting means for moving said supporting means about said pivot to a position inclined relative to the horizontal,
    (f) means for depositing an expandable thermal insulating material into said annular space between said outer peripheral surface of said first asbestos-cement pipe and the inner peripheral surface of said second asbestos-cement pipe,
    (g) means for inserting a ring-shaped fluid-impervious member between and in contact with the outer peripheral surface of said first asbestos-cement pipe and the inner peripheral surface of said second asbestos-cement pipe adjacent the other axial extremity of said second asbestos-cement pipe,
    (h) means for moving said supporting means from said inclined position to a horizontal position after said expandable thermal insulating material has expanded to fill said annular space between the outer peripheral surface of said first asbestos-cement pipe and the inner peripheral surface of said second asbestos-cement pipe, and
    (i) means for removing said support means from said first and second asbestos-cement pipes after said expandable thermal insulating material has expanded to fill said annular space between the outer peripheral surface of said first asbestos-cement pipe and the inner peripheral surface of said second asbestos-cement pipe.

References Cited

UNITED STATES PATENTS

| | | | |
|---|---|---|---|
| 1,316,992 | 9/1919 | Wolerer | 18—29 |
| 1,457,290 | 5/1923 | Schroeder | 18—29 X |
| 2,349,213 | 5/1944 | Van Niekerk | 25—30 X |
| 2,449,900 | 9/1948 | Johnson. | |
| 2,881,476 | 4/1959 | Page | 18—26 |
| 2,904,836 | 9/1959 | Jefferson et al. | 18—26 |
| 3,134,140 | 5/1964 | Knowles | 18—26 |
| 3,173,175 | 5/1965 | Lemelson | 18—26 |

WILLIAM J. STEPHENSON, *Primary Examiner.*